(12) United States Patent
Konno

(10) Patent No.: US 10,468,690 B2
(45) Date of Patent: Nov. 5, 2019

(54) FUEL CELL SEPARATOR AND FUEL CELL

(71) Applicant: TOYOTA JIDOSHA KABUSHIKI KAISHA, Toyota-shi, Aichi-ken (JP)

(72) Inventor: Norishige Konno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 693 days.

(21) Appl. No.: 15/023,825

(22) PCT Filed: Sep. 30, 2014

(86) PCT No.: PCT/JP2014/004992
§ 371 (c)(1),
(2) Date: Mar. 22, 2016

(87) PCT Pub. No.: WO2015/049860
PCT Pub. Date: Apr. 9, 2015

(65) Prior Publication Data
US 2016/0248104 A1    Aug. 25, 2016

(30) Foreign Application Priority Data
Oct. 2, 2013 (JP) .................. 2013-207008

(51) Int. Cl.
*H01M 8/0265* (2016.01)
*H01M 8/026* (2016.01)
(Continued)

(52) U.S. Cl.
CPC ......... *H01M 8/026* (2013.01); *H01M 8/0267* (2013.01); *H01M 8/241* (2013.01); *H01M 8/2483* (2016.02)

(58) Field of Classification Search
CPC ....... H01M 2008/1095; H01M 8/0254; H01M 8/026; H01M 8/0265; H01M 8/0267;
(Continued)

(56) References Cited

U.S. PATENT DOCUMENTS 6,490,778 B1    12/2002 Funatsu et al.
6,613,470 B1 *  9/2003 Sugita ............. H01M 8/0258
                                                           429/416
(Continued)

FOREIGN PATENT DOCUMENTS

JP    2000-113897    4/2000
JP    2012-256498   12/2012
(Continued)

*Primary Examiner* — Stewart A Fraser
*Assistant Examiner* — Victoria H Lynch
(74) *Attorney, Agent, or Firm* — Dickinson Wright, PLLC

(57) ABSTRACT

An anode-side separator 120 includes first grooves 202 and second grooves 204 that are formed alternately, by formation of a plurality of pit-and-bump stripes provided by press molding, in a separator central region 121 opposed to a power generation region 112 of a MEGA 110. Terminal first grooves 202*t* is extended at an upper edge of the separator central region 121 in which the first grooves 202 and the second grooves 204 are formed. The terminal first grooves 202*t* include a depressed corner recess 202*tb* made shallower in groove depth in a corner portion of the separator central region 121 on a fuel-gas supply hole side. The depressed corner recess 202*tb* connects between the second grooves 204 that extend below the terminal first grooves 202*t*, and the outer edge portion 123.

7 Claims, 10 Drawing Sheets

(51) Int. Cl.
*H01M 8/2483* (2016.01)
*H01M 8/241* (2016.01)
*H01M 8/0267* (2016.01)

(58) Field of Classification Search
CPC .......... H01M 8/04029; H01M 8/1004; H01M 8/2405; H01M 8/241; H01M 8/2483
See application file for complete search history.

(56) References Cited

U.S. PATENT DOCUMENTS

| | | | |
|---|---|---|---|
| 2004/0106028 A1* | 6/2004 | Sugiura | H01M 8/0258 429/434 |
| 2007/0154758 A1 | 7/2007 | Kikuchi et al. | |
| 2012/0301806 A1 | 11/2012 | Okabe | |
| 2013/0177827 A1 | 7/2013 | Okabe et al. | |

FOREIGN PATENT DOCUMENTS

| | | |
|---|---|---|
| WO | WO 2012/035585 A1 | 3/2012 |
| WO | WO 2012/160607 A1 | 11/2012 |

* cited by examiner

FUEL CELL SEPARATOR AND FUEL CELL

CROSS-REFERENCE TO RELATED APPLICATIONS

This application is a national phase application of International Application No. PCT/JP2014/004992, filed Sep. 30, 2014, and claims the priority of Japanese Application No. 2013-207008, filed Oct. 2, 2013, the content of both of which is incorporated herein by reference.

TECHNICAL FIELD

The present invention relates to a fuel cell separator and a fuel cell.

BACKGROUND ART

A fuel cell is provided in a stack structure in which fuel cell-constituting unit cells each serving as a power generation unit are stacked in a plurality of layers. Each of the unit cells has a membrane electrode assembly sandwiched by opposing separators. In recent years, there has been proposed, e.g. in International Publication No. WO2012/160607, a technique for forming, in a separator central region opposed to a power generation region of the membrane electrode assembly, a fuel-gas gas flow path and a cooling water flow path on top-and-bottom surfaces of the separator by a plurality of pit-and-bump stripes made by press molding or by a plurality of protruded portions.

The cooling water flow path proposed in the above-cited patent reference has cooling water to pass through with changing flow direction by height differences between the protruded portions and the recessed-groove bottom portions. Thus, diffusivity and distributivity of cooling water are improved. On the other hand, when the cooling water passes through parts having height differences such as the protruded portions or the recessed-groove bottom portions with changing the flow direction, the flow of the cooling water may be stagnated. After starting an operation of the fuel cell, no particular obstacle is raised even if the flow of the cooling water has been stagnated since the cooling water has already been delivered over the cooling water flow path so that the flow path is filled with the cooling water. However, after just assemble of the fuel cell is completed, it has been pointed out that the following new problems could occur since air remains in the cooling water flow path.

When the cooling water is supplied after completion of the assemble of the fuel cell, the cooling water passes through with changing the flow direction in an air-mixed state. Therefore, depending on how the flow of the cooling water is stagnated, air can remain in the flow path without being pushed away by the cooling water, and then such air may rise to a vertical upper end of the separator central region. This may, cause an air accumulation. Although such air accumulation can be pushed away in some cases by the supply of the cooling water after starting of an operation of the fuel cell, if the air accumulation still remains at the upper end of the separator central region, hinders the cooling at the air accumulation. Since the above-cited patent reference has no consideration of possibility of an air accumulation, there is need avoiding the air accumulation on the upper end side of the separator central region. In addition, there is need reducing manufacturing costs for the separator having recessed grooves as the cooling water flow path or for the fuel cell.

In order to achieve at least part of the above-described problems, the present invention may be implemented in the following aspects.

SUMMARY

In a first aspect, a fuel cell separator is provided. The fuel cell separator according to the first aspect is a fuel cell separator is assembled to a membrane electrode assembly, and has a first surface and a second surface as a back surface of the first surface. The fuel cell separator includes a central region opposed to a power generation-enabled region of the membrane electrode assembly, an outer edge portion extending from the central region to surrounding edge portion of the central region; a first surface-side recessed groove part including a plurality of grooves formed in the central region on the first surface; a second surface-side recessed groove part including a plurality of grooves formed in the central region on the second surface; and an air discharge part formed on an upper end side of the central region in the first surface-side recessed groove part, the air discharge part connecting between the central region and the outer edge portion, and discharging air within the grooves of the second surface-side recessed groove part from the central region to the outer edge portion along with the cooling water. The air discharge part is formed at a place where air within the grooves of the second surface-side recessed groove part is accumulable on the upper end side of the central region because of changing flow direction of the cooling water passing through the second surface-side recessed groove part. According to the fuel cell separator of the first aspect, even if air within the grooves of the second surface-side recessed groove part is accumulated on the upper end side of the separator central region, the air discharge part provided at the place where an air accumulation occurs allows the air to be discharged to the outer edge portion, avoiding the air accumulation on the upper end side of the separator central region.

The fuel cell separator according to the first aspect may further include: a cooling water supply-side manifold disposed at the outer edge portion on one side of the central region in horizontal direction; and a cooling water introducing part configured to diffuse and introduce cooling water supplied from the cooling water supply-side manifold into the individual grooves of the second surface-side recessed groove part with changing flow direction of the cooling water, wherein the air discharge part may be formed at a central-region corner portion positioned on the upper end side of the central region and on the side of the cooling water introducing part. Since cooling water passes through the cooling water introducing part with changing the flow direction, although an air accumulation may occur on the upper side of the cooling water introducing part, the fuel cell separator according to the first aspect allows avoiding further the air accumulation by the air discharge part positioned at a corner portion of the separator central region.

The fuel cell separator according to the first aspect may further include a fuel gas supply-side manifold configured to supply fuel gas into the grooves of the first surface-side recessed groove part, the fuel gas supply-side manifold disposed at the upper side of the cooling water supply-side manifold in the outer edge portion. Since fuel gas is regularly supplied, as unconsumed state, into the grooves of the first surface-side recessed groove part on the fuel gas supply-side manifold side, the fuel cell having the fuel cell separator according to the first aspect allows electrochemical reaction for power generation to be accelerated so that heat generation due to the electrochemical reaction is more activated. According to the fuel cell separator of the first aspect, the fuel gas supply-side manifold side closer to the corner portion of the separator central region can be cooled sufficiently by virtue of avoiding the air accumulation at the corner portion of the separator central region on the upper side of the cooling water introducing part.

In the fuel cell separator according to the first aspect, the grooves of the first surface-side recessed groove part and the grooves of the second surface-side recessed groove part may be formed alternately on the first surface and the second surface in the central region by formation of a plurality of pit-and-bump stripes provided by press molding of the central region, and the air discharge part may be a bottom-wall recessed part where a bottom wall of the first surface-side recessed groove part positioned at the upper end of the separator central region is recessed. In this case, since the bottom-wall recessed part as the air discharge part may be formed simultaneously with the first surface-side recessed groove part and the second surface-side recessed groove part by press molding of the separator central region, the manufacturing cost can be reduced.

In the fuel cell separator according to the first aspect, the cooling water introducing part may include shallow groove portions being scatteredly along path of the first surface-side recessed groove part, wherein the shallow groove portions are partly shallower in depth in the first surface-side recessed groove part and are formed alternately on the first surface and the second surface against the second surface-side recessed groove part. In this case, since cooling water passes through between neighboring second surface-side recessed groove parts by the shallow groove portions of the first surface-side recessed groove part, the flow direction of the cooling water is changed, so that the cooling water introducing part is enabled to diffuse and introduce the cooling water into the grooves of the individual second surface-side recessed groove parts. Moreover, since the shallow groove portions of the first surface-side recessed groove part may be formed simultaneously with those of the second surface-side recessed groove part by press molding of the separator central region, the manufacturing cost can be reduced.

In a second aspect, a fuel cell comprising stacked plurality of unit cells is provided The fuel cell according to the second aspect each of the unit cells has a membrane electrode assembly sandwiched between a first separator and a second separator. Each of the unit cells including any one of the above-described fuel cell separators according to the first aspect as the first separator, wherein in the unit cells adjoiningly stacked, the bottom wall of the first surface-side recessed groove part included in the first separator of one of the unit cells is in contact with the second separator of the other unit cell.

According to the fuel cell of the second aspect, since the first separator that sandwiches the membrane electrode assembly allows avoiding an air accumulation on the upper end side of the separator central region in the individual unit cells, cooling failures due to the presence of an air accumulation can be suppressed. Also, according to the fuel cell of the second aspect, since the first separator having the air discharge part may be replaced with another one in the existing unit cell, its manufacturing cost can be reduced and moreover cooling failures due to the presence of an air accumulation can be solved or suppressed with simplicity. In addition, in the fuel cell according to the second aspect, the first surface-side recessed groove part in the separator central region of the first separator can be made to serve also as a flow path for the gas supplied to the membrane electrode assembly. Further, by putting the bottom wall of the first surface-side recessed groove part included in the first separator of one unit cell, out of unit cells stacked neighboring each other, into contact with the second separator of the other unit cell, the second surface-side recessed groove part can be closed so that the closed second surface-side recessed groove part can be made to serve as a cooling water flow path that allows the cooling water to pass therethrough.

The present invention may be implemented in various modes. For example, the invention may be implemented in such modes as a manufacturing method for fuel cells or a unit cell for fuel cells.

DESCRIPTION OF EMBODIMENTS

Figure 1:
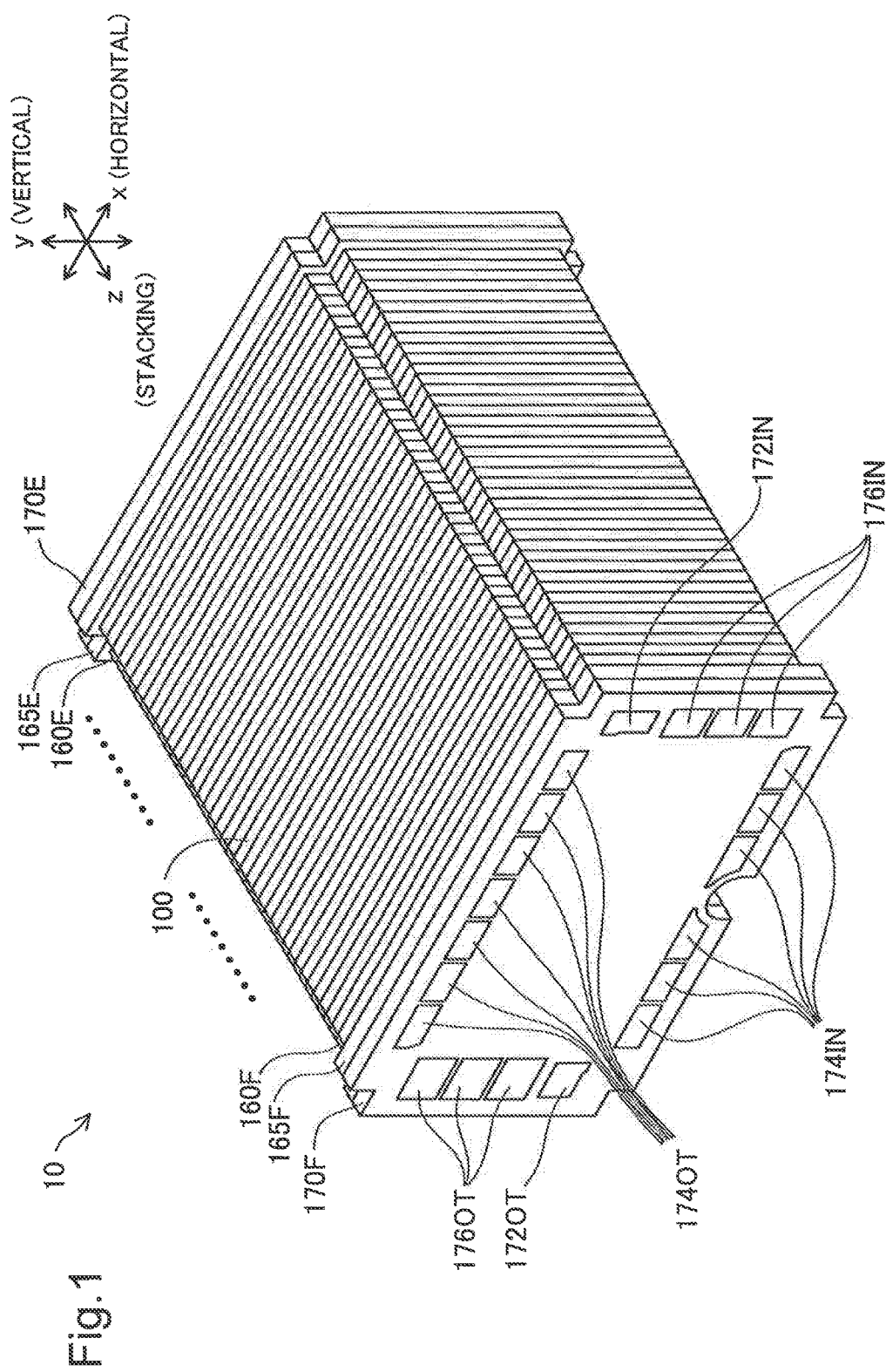
FIG. 1 is an outlined perspective view showing a configuration of a fuel cell 10 as an embodiment of the invention.

An embodiment of the present invention will be described with reference to the accompanying drawings. FIG. 1 is an outlined perspective view showing a configuration of a fuel cell 10 as an embodiment of the invention. The fuel cell 10 has a stack structure in which fuel-cell unit cells 100 are stacked in plural layers in a Z direction (hereinafter, referred to also as "stacking direction"), the unit cells are sandwiched between a pair of end plates 170F, 170E. The fuel cell 10 has a front end-side terminal plate 160F between the front end-side end plate 170F and the unit cells 100, with a front end-side insulating plate 165F interposed therebetween. The fuel cell 10 also has a rear end-side terminal plate 160E between the rear end-side end plate 170E and the unit cells 100, similarly, with a rear end-side insulating plate 166E interposed therebetween. The unit cells 100, the terminal plates 160F, 160E, the insulating plates 165F, 165E, and the end plates 170F, 170E each have a plate structure which has a generally rectangular external shape and which is positioned that its longer side extends along an x direction (horizontal direction) and its shorter side extends along a y direction (vertical direction).

The end plate 170F, the insulating plate 165F and the terminal plate 160F on the front end side each have a fuel gas supply hole 172IN and a fuel gas discharge hole 172OT, a plurality of oxidizing gas supply holes 174IN and a plurality of oxidizing gas discharge holes 174OT, and a plurality of cooling water supply holes 176IN and a plurality of cooling water discharge holes 176OT. These supply/discharge holes are coupled to holes (not shown) provided at corresponding positions of the individual unit cells 100, respectively, to form gas or cooling water supply/discharge manifolds, respectively. On the other hand, these supply/discharge holes are not provided for the rear end-side end plates 170E, the insulating plates 166E and the terminal plates 160E on the rear end side. This is because the fuel cell is such a type that while reactant gases (fuel gas, oxidizing gas) and cooling water are being supplied from the front end-side end plate 170F to the individual unit cells 100 via the supply manifold, discharge gas and discharge water derived from the individual unit cells 100 are discharged from the front end-side end plate 170F to outside via the discharge manifold. However, the fuel cell is not limited to this and, for example, may be provided in various types such as a type that reactant gases and cooling water are supplied from the front end-side end plate 170F and discharge gas and discharge water are discharged from the rear end-side end plate 170E to outside.

The plurality of oxidizing gas supply holes 174IN are disposed along the x direction (longerside direction) at a lowerend outer edge portion of the front end-side end plate 170F, while the plurality of oxidizing gas discharge holes 174OT are disposed along the x direction at an upperend outer edge portion. The fuel gas supply hole 172IN is disposed at a y-direction (shorter side direction) upper end portion of a right-end outer edge portion of the front end-side end plate 170F, while the fuel gas discharge hole 172OT is disposed at a y-direction lower end portion of a left-end outer edge portion. The plurality of cooling water supply holes 176IN are disposed in array along the y direction under the fuel gas supply hole 172IN, while the plurality of cooling water discharge holes 176OT are disposed in array along the y direction above the fuel gas discharge hole 172OT. Then, the upper two cooling water supply holes 176IN out of the array of the cooling water supply holes 176IN are positioned so as to be opposed to the lower two cooling water discharge holes 176OT out of the array of the cooling water discharge holes 176OT, so that the cooling water supply holes 176IN and the cooling water discharge holes 176OT partly overlap with each other in the y direction (up/down direction) with the separator central region 121 interposed therebetween.

The front end-side terminal plate 160F and the rear end-side terminal plate 160E are current collector plates to collect generated electric power of the unit cells 100, and output collected electric power to outside from unshown terminals.

Figure 2:
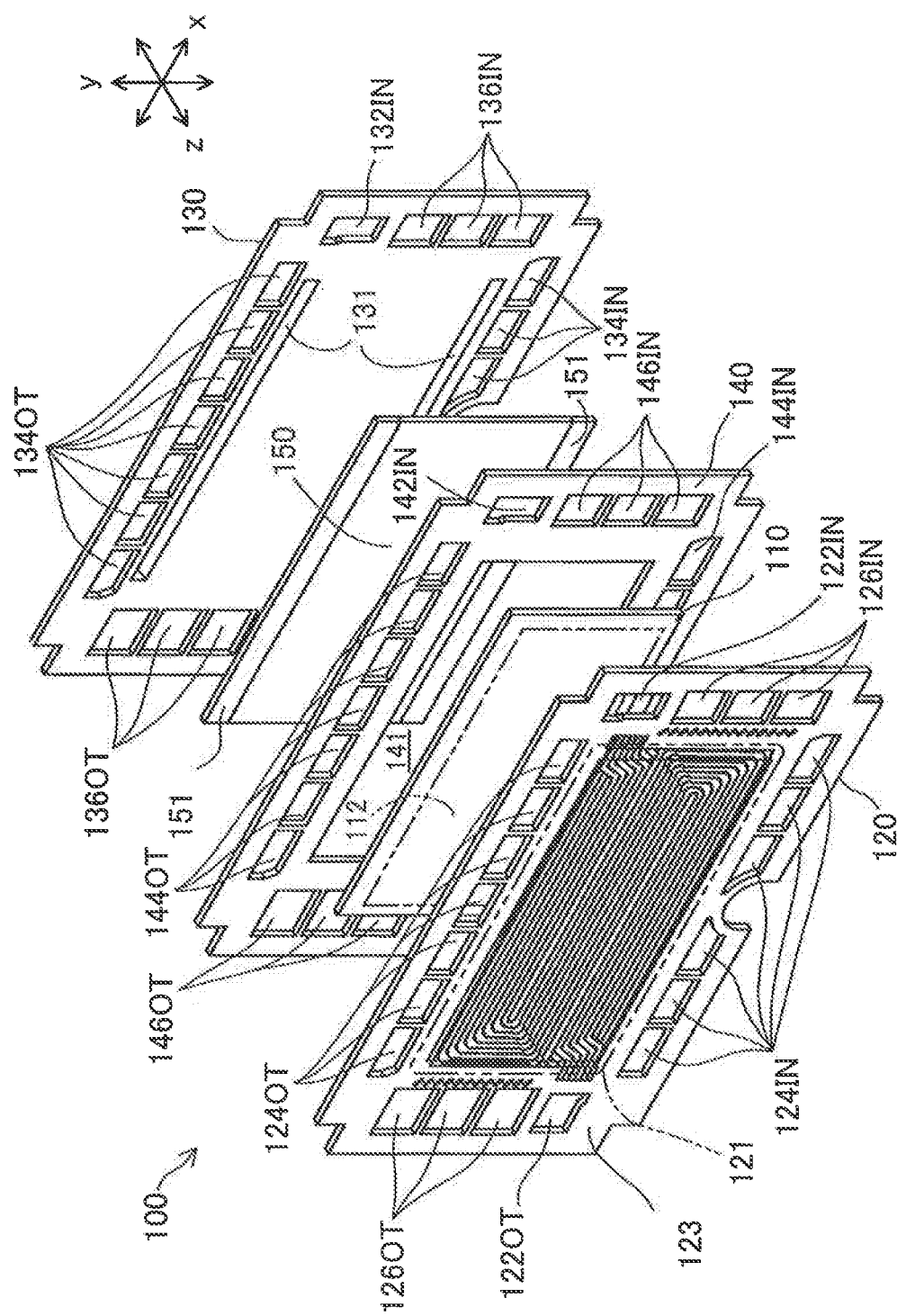
FIG. 2 is an outlined exploded perspective view showing a structure of a unit cell 100.

FIG. 2 is an outlined exploded perspective view showing a structure of a unit cell 100. As shown in the figure, the unit cell 100 includes a MEGA (Membrane Electrode & Gas Diffusion Layer Assembly) 110, an anode-side separator 120, a cathode-side separator 130, an adhesive seal 140, and a gas flow path member 150, where the separators 120, 130, seal 140 and member 150 are disposed so as to sandwich both sides of the MEGA 110.

The MEGA 110 is a power generation body that includes an MEA (Membrane Electrode Assembly) with a pair of catalytic electrode layers formed on both sides of an electrolyte membrane and in which the MEA is sandwiched by gas diffusion layers (GDIs) intended for gas diffusive permeation. It is noted that the term MEGA herein may be referred to as MEA in some cases.

The anode-side separator 120 and the cathode-side separator 130 are formed from a member having gas barrier property and electron conductivity, the member exemplified by carbon members such as densified carbon formed by compacting carbon particles to impart gas impermeability thereto or metal members such as press-molded stainless steel or titanium steel. In this embodiment, the anode-side separator 120 is fabricated by press molding of stainless steel.

The anode-side separator 120 has a plurality of grooved fuel gas flow paths on MEGA 110-side surface as well as a plurality of grooved cooling water flow paths on opposite-side surface, both types of flow paths being arranged alternately on top-and-bottom surfaces of the separator. These flow paths will be described later. The anode-side separator 120 includes, as the above-described supply/discharge holes constituting the manifold, a fuel gas supply hole 122IN and a fuel gas discharge hole 122OT, a plurality of oxidizing gas supply holes 124IN and a plurality of oxidizing gas discharge holes 124OT, and a plurality of cooling water supply holes 126IN and a plurality of cooling water discharge holes 126OT. Similarly, the cathode-side separator 130 includes, a fuel gas supply hole 132IN and a fuel gas discharge hole 132OT, a plurality of oxidizing gas supply holes 134IN and a plurality of oxidizing gas discharge holes 134OT, and a plurality of cooling water supply holes 136IN and a plurality of cooling water discharge holes 136OT. Further, the adhesive seal 140 also similarly includes, in correspondence to the supply/discharge holes of the anode-side separator 120, a fuel gas supply hole 142IN and a fuel gas discharge hole 142OT, a plurality of oxygen gas supply holes 144IN and a plurality of oxidizing gas discharge holes 144OT, and a plurality of cooling water supply holes 146IN and a plurality of cooling water discharge holes 146OT.

The adhesive seal 140, which is formed from resin or rubber or the like having sealing and insulating properties, has in its center a power generation region window 141 fitted to the rectangular shape of the MEGA 110. A peripheral edge of the power-generation region window 141 is formed into a step gap shape so that the MEGA 110 is to be fitted and assembled to the step gap portion. The MEGA 110 assembled to the power-generation region window 141 in this way overlaps with the adhesive seal 140 at the step gap portion of the adhesive seal 140, where a region exposed in the power generation region window 141 is defined as a power generation-enabled region (hereinafter, referred to as "power generation region") 112 that receives supply of the fuel gas from the later-described anode-side separator 120 so that at least part of the region is enabled to fulfill power generation by electrochemical reaction. The adhesive seal 140 has the already-described supply/discharge holes in regions around the power-generation region window 141 to which the MEGA 110 is assembled. With the MEGA 110 assembled to the power-generation region window 141, the adhesive seal 140 seals the anode-side separator 120 and the cathode-side separator 130 with their supply/discharge holes included. That is, the adhesive seal 140 not only seals the MEGA 110 at the step gap portion in coverage to outer regions of the power generation region 112 but also seals the outer peripheral surface of the rectangular shape of the MEGA 110 between the anode-side separator 120 and the cathode-side separator 130. In addition, each of both anode-side and cathode-side separators includes fuel gas sealing materials 300, oxidizing sealing materials 301 and a cooling water sealing material 302 as shown in later-described FIG. 3 in order that sealability of the supply/discharge holes for the fuel gas, the oxidizing gas and the cooling water, respectively, is ensured at the junction surfaces between separators when the unit cells 100 are stacked.

The gas flow path member 150, which is positioned between the MEGA 110 and the cathode-side separator 130 with the adhesive seal 140 interposed therebetween, forms oxidizing gas flow paths ranging from the oxidizing gas supply holes 134IN to the oxidizing gas discharge holes 134OT. Then, the gas flow path member 150 has upper-and-lower ends of the member extending so as to overlap with upper ends of the oxidizing gas supply holes 134IN and lower ends of the oxidizing gas discharge holes 134OT. Therefore, the gas flow path member 150 allows the oxidizing gas, which is supplied through the oxidizing gas supply holes 134IN of the cathode-side separator 130, to be led in from the member lower end, then making the led-in oxidizing gas flow along a planar direction (XY-plane direction) of the MEGA 110. Then, the gas flow path member 150 discharges excess oxidizing gas from the member upper end to the oxidizing gas discharge holes 134OT. The gas flow path member 150 like this is formed by using a porous material having gas diffusivity and electrical conductivity such as a porous metal (e.g., expanded metal). Also, the gas flow path member 150 includes gas-impermeable thin sealing sheets 151 at its upper-and-lower ends as in FIG. 2, the sheets being joined with upper-and-lower end regions of the MEGA 110.

The cathode-side separator 130 is formed into a generally planar shape, including regions for formation of the already-described supply/discharge holes, and limbs 131 are protruded on the back side of the drawing sheet of FIG. 2 near the upper-and-lower ends of the gas flow path member 150 in FIG. 2. These limbs 131 are brought into contact with a later described outer edge portion 123 of the anode-side separator 120 of a neighboring unit cell 100 when the unit cells 100 are stacked. This aspect will be described later.

Figure 3:
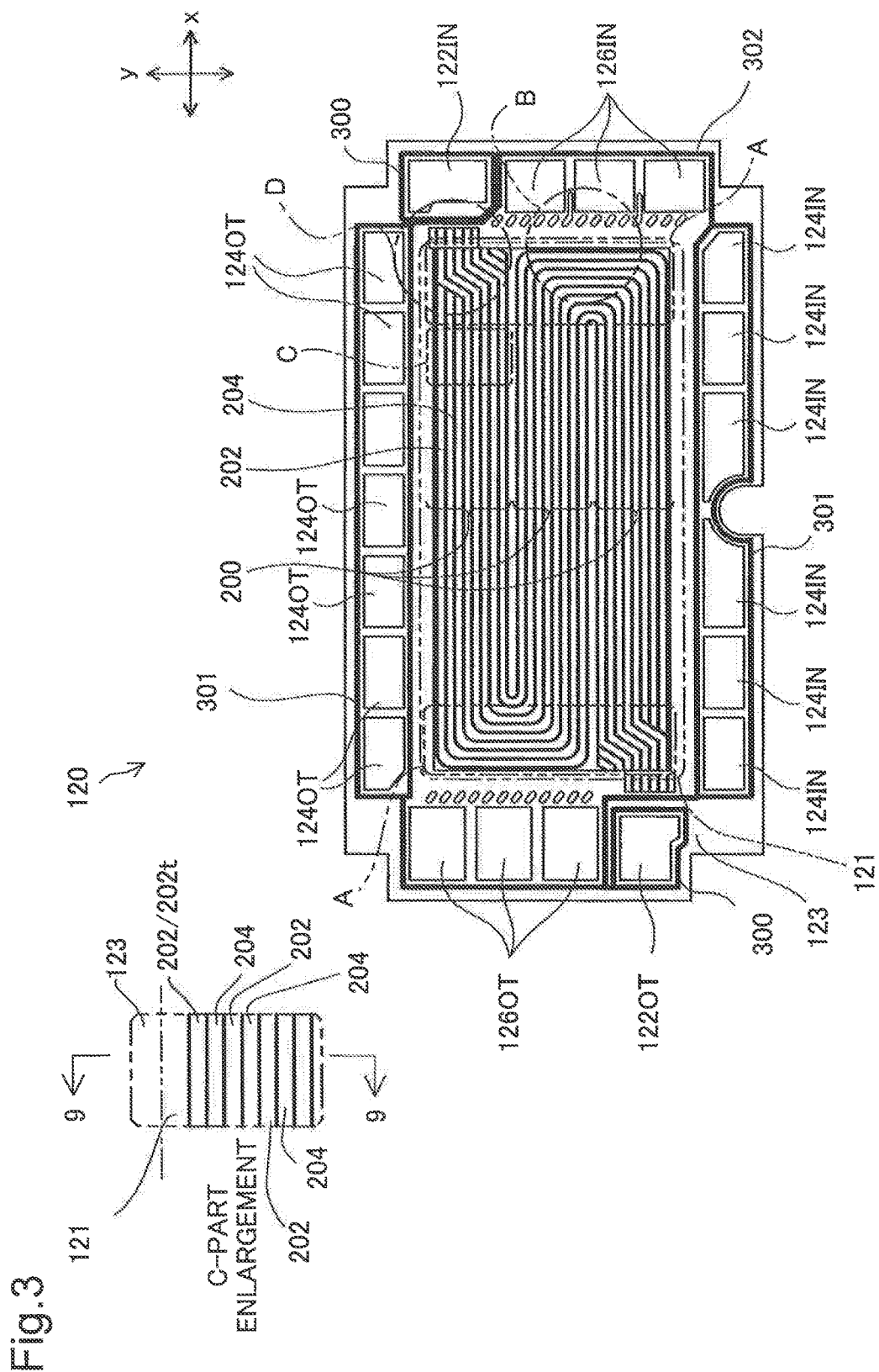
FIG. 3 is an outlined plan view showing a structure of an anode-side separator 120

FIG. 3 is an outlined plan view showing a structure of the anode-side separator 120. This FIG. 3 shows a state as viewed from one surface (hereinafter, referred to also as 'cooling surface') side facing another unit cell 100 neighboring the anode-side separator 120. A surface opposite to this cooling surface and facing the MEGA 110 will be referred to also as "gas surface." The anode-side separator 120, which is formed by press molding stainless steel or the like, sandwiches the MEGA 110 in cooperation with the cathode-side separator 130, with the adhesive seal 140 and the gas flow path member 150 interposed therebetween as shown in FIG. 2. In this anode-side separator 120, a plurality of first grooves 202 and a plurality of second grooves 204, which will be described later, are juxtaposed alternately and successively in the separator central region 121 opposed to the already-described power generation region 112 of the MEGA 110. The anode-side separator 120 includes, in a planar outer edge portion 123 extending outward from the separator central region 121 to surround the central region, as the already-described supply/discharge holes for reactant gas and cooling water, a fuel gas supply hole 122IN and a fuel gas discharge hole 122OT, a plurality of oxidizing gas supply holes 124IN and a plurality of oxidizing gas discharge holes 124OT, and a plurality of cooling water supply holes 126IN and a plurality of cooling water discharge holes 126OT. Out of these supply/discharge holes, the fuel gas supply hole 122IN and the fuel gas discharge hole 122OT are sealed individually by the fuel gas sealing materials 300, while the plurality of oxidizing gas supply holes 124IN and the plurality of oxidizing gas discharge holes 124OT are sealed on a hole-array basis by the oxidizing sealing materials 301, respectively. Also, the cooling water sealing material 302 surrounds a cooling water flow region including the plurality of cooling water supply holes 126IN and the plurality of cooling water discharge holes 126OT as well as the cooling surface-side separator central region 121 to seal the cooling water flow region. Such supply/discharge hole sealing is applied also to the cathode-side separator 130.

The first grooves 202 are recessed grooves that are recessed on the already-described gas surface side (first surface) of the anode-side separator 120, i.e., on the back side of the drawing sheet of FIG. 3, the grooves extending on the gas surface. The second grooves 204 are recessed grooves that are recessed on the already-described cooling surface side (second surface) of the anode-side separator 120, i.e., on the front side of the drawing sheet of FIG. 3, the grooves extending on the cooling surface. Then, the first grooves 202 and the second grooves 204 are formed into a plurality of pit-and-bump stripes by press molding in which a pit-and-bump shaped metal mold fitted to the two groove shapes is pressed against the separator central region 121 so that the two types of grooves are juxtaposed alternately and successively on the front-and-back surfaces (first and second surfaces) of the anode-side separator 120 in the separator central region 121. That is, the anode-side separator 120 is formed into a pit-and-bump shape in cross section (corrugated shape in cross section) with the first grooves 202 and the second grooves 204 juxtaposed alternately and successively, as viewed in the longitudinal sectional view of FIG. 3.

The first grooves 202 recessed on the gas surface side constitute fuel-gas flow path grooves (hereinafter, referred to also as 'fuel-gas flow path grooves 202') for supplying the fuel gas to the MEGA 110 exposed in the power-generation region window 141 of the adhesive seal 140. In addition, the plurality of first grooves 202 constitute a first surface-side recessed groove part. Also, the second grooves 204 recessed on the cooling surface side constitute ribs for partitioning the fuel-gas flow path grooves 202 and moreover constitute cooling-water flow path grooves (hereinafter, referred to also as 'cooling-water flow path grooves 204') for allowing the cooling water to pass therethrough by virtue of contact of the anode-side separator 120 with the later-described cathode-side separator 130. In addition, the plurality of second grooves 204 constitute a second surface-side recessed groove part. Then, a fuel gas flow path 200 constituted of the plurality of fuel-gas flow path grooves 202 is formed on the already-described gas surface side on the drawing-sheet back side of FIG. 3 in a serpentine shape ranging from the fuel gas supply hole 122IN toward the fuel gas discharge hole 122OT. In the unit cells 100 of this embodiment, in the serpentine-shaped fuel gas flow path 200, the fuel-gas flow path grooves 202 positioned on the upper-and-lower end sides of the separator central region 121 shown in FIG. 3 extend along the left/right direction of the separator central region 121, i.e. x direction in FIG. 3, on the outer edge portion 123 side. In this case, when the separator central region 121 is opposed to the power generation region 112 of the MEGA 110, the fuel gas can be supplied also to peripheral edges of the power generation region 112 from the fuel-gas flow path grooves 202 extending in the left/right direction of the separator central region 121 on the outer edge portion 123 side. It is noted that, as shown in C-part enlargement of FIG. 3, first grooves 202 which are positioned on upper-and-lower terminal-end sides of the separator central region 121 and which extend in the left/right direction of the separator central region 121 on the outer edge portion 123 side will be referred to as terminal first grooves 202t so as to be distinguishable from first grooves 202 positioned inside the separator central region 121.

The fuel-gas flow path grooves 202, which are formed into serpentine-shaped groove paths, are changed in groove-path direction from the x direction to the y direction or, conversely, from the y direction to the x direction in the right-and-left horizontal-end side turn-over regions A of the separator central region 121 shown in FIG. 3, and moreover changed in groove-path direction to skewed ones in vicinities of the fuel gas supply hole 122IN and the fuel gas discharge hole 122OT. Then, the first grooves 202, including the turn-over regions A, function as ribs for partitioning the cooling-water flow path grooves 204 on the cooling surface side in the linear flow path region extending in the x direction. Even though, the fuel-gas flow path grooves 202, function as ribs for partitioning the cooling-water flow path grooves 204 in the linear flow path region extending in the x direction, they do not obstruct the flow of cooling water at the second grooves 204 directed toward the cooling water discharge holes 126OT. However, in the turn-over regions A in which the groove-path direction is changed, the fuel-gas flow path grooves 202 serve as walls that can obstruct the flow of cooling water directed from the cooling water supply holes 126IN toward the cooling water discharge holes 126OT. Therefore, for prevention of this, the fuel-gas flow path grooves 202 in those regions are provided in a structure described below.

Figure 4:
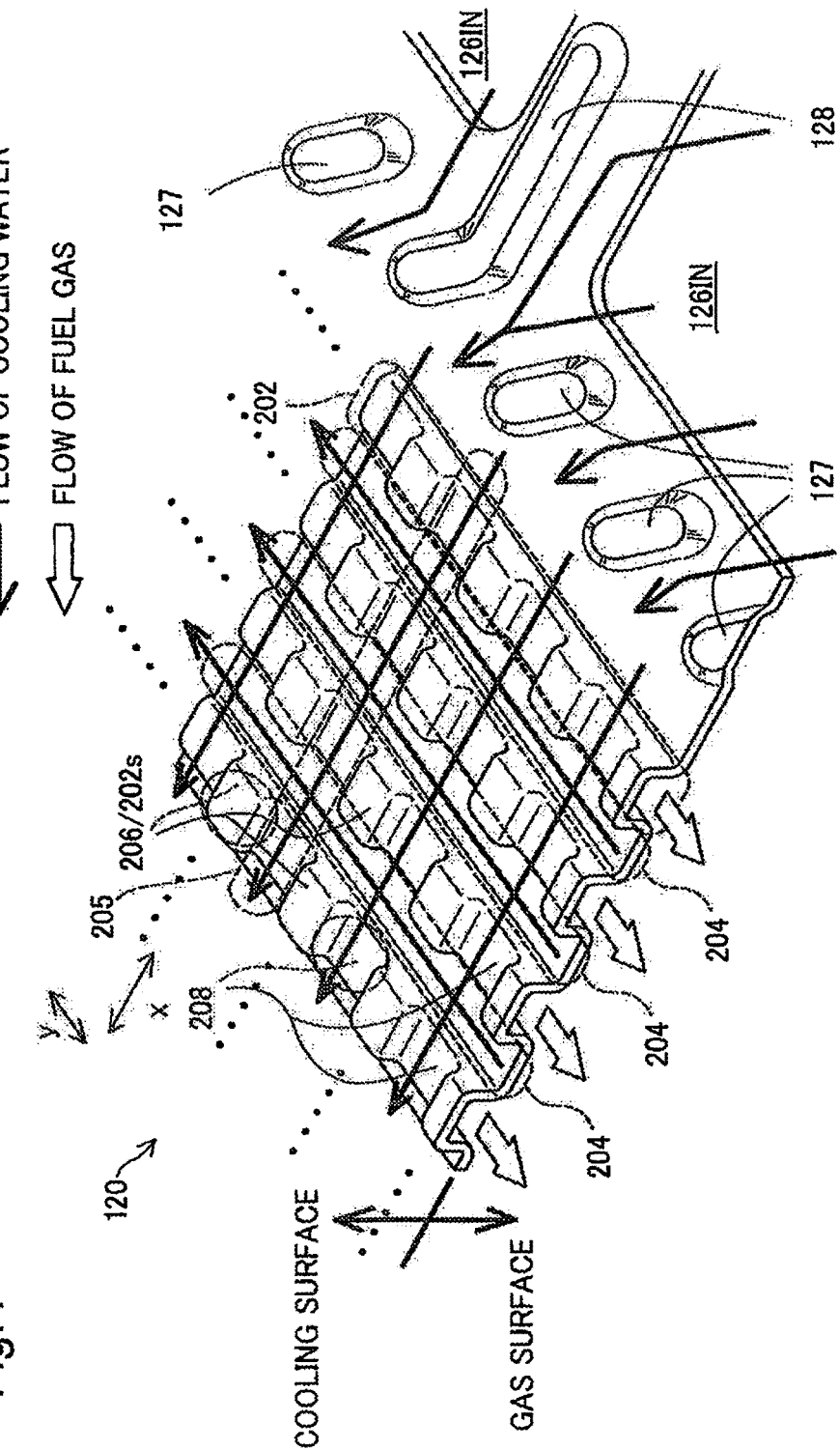
FIG. 4 is an outlined perspective view showing, in enlargement, a way how flow path grooves are formed in a cooling-water-supply-hole vicinal region B included in a turn-over region A shown in FIG. 3.

FIG. 4 is an outlined perspective view showing, in enlargement, a way how flow path grooves are formed in a cooling-water-supply-hole vicinal region B included in the turn-over region A shown in FIG. 3. In FIG. 4, the drawing-sheet front side is the cooling surface side while the drawing-sheet back side is the gas surface side. In the fuel-gas flow path grooves 202 formed along the y direction, shallow groove portions 208 are formed scatteredly. The shallow groove portions 208 are portions shallower in depth than the other portions (referred to also as 'deep groove portions 206'). It is noted here that the term, depth of a fuel-gas flow path groove 202, refers to a distance ranging from a position of its contact with the MEGA 110 in the gas surface of the anode-side separator 120 to a bottom of the fuel-gas flow path groove 202. Accordingly, although the depth of the fuel-gas flow path grooves 202 is deeper in positions of the deep groove portions 206 and shallower at positions of the shallow groove portions 208, yet the deep groove portions 206 and the shallow groove portions 208, which are juxtaposed alternately and successively along the groove paths of the fuel-gas flow path grooves 202 in the turn-over regions A of FIG. 3, are both out of contact with the MEGA 110. Thus, the fuel-gas flow path grooves 202 allow the fuel gas to pass therethrough along the flow-path-groove routes even in the turn-over regions A of FIG. 3. In this case, the deep groove portions 206 is set equal in depth to fuel-gas flow path grooves 202 in the flow-path-groove routes (fuel gas flow path 200; see FIG. 3) other than in the turn-over regions A.

Also, in the fuel cell 10 in which a plurality of unit cells 100 are stacked (see FIGS. 1 and 2), the anode-side separator 120 is so arranged that outer peripheral surfaces, i.e. ceiling surfaces in FIG. 4, of bottom walls 202s of the individual deep groove portions 206 are set into contact with the surface of the cathode-side separator 130 of a neighboring unit cell 100, but are kept out of contact with the cathode-side separator 130 at the positions of the shallow groove portions 208. As a result of this, on the cooling surface side at positions of the shallow groove portions 208 in the anode-side separator 120, a plurality of communicative flow path grooves 206 are formed against the surface of the cathode-side separator 130 so that two cooling-water flow path grooves 204 neighboring with the shallow groove portions 208 interposed therebetween are communicated with each other. These communicative flow path grooves 205 intersect the cooling-water flow path grooves 204 extending in the y direction from the cooling water supply holes 126IN side. With this structure, the cooling water is allowed to not only flow in the y direction along the cooling-water flow path grooves 204, but also flow in the x direction via the communicative flow path grooves 205. That is, since the communicative flow path grooves 205 permit the cooling water to pass through in their neighboring cooling-water flow path grooves 204, there occurs circulation of the cooling water between the neighboring cooling-water flow path grooves 204. As a result, cooling water flowing through the cooling-water flow path grooves 204 extending along the x direction in the turn-over regions A flows along the cooling-water flow path grooves 204 or across the neighboring cooling-water flow path grooves 204 without being interrupted by the fuel-gas flow path grooves 202 extending along the y direction. The cooling-water flow path grooves 204 extending in the y direction in the cooling-water-supply-hole vicinal region B shown in FIG. 4 then turn to extend in the x direction as shown in FIG. 3, allowing the cooling water to flow along the groove paths in the range of extension in the x direction.

Although not shown, shallow groove portions 208 are similarly formed scatteredly also in the fuel-gas flow path grooves 202 extending in the x direction in the turn-over regions A shown in FIG. 3. As a result of this, the flow of cooling water flowing in the cooling-water flow path grooves 204 parallel to the fuel-gas flow path grooves 202 extending along the y direction is not interrupted by the fuel-gas flow path grooves 202 extending along the x direction. Moreover, shallow groove portions 208 are similarly formed scatteredly not only in the fuel-gas flow path grooves 202 extending along the x direction and the y direction but also in the fuel-gas flow path grooves 202 which turn to be oblique in groove-path direction relative to the x direction and the y direction in the turn-over regions A. As a result of this, the flow of cooling water flowing in the cooling-water flow path grooves 204 parallel to the fuel-gas flow path grooves 202 having their groove-path directions extending obliquely to the x direction and the y direction is not interrupted by the fuel-gas flow path grooves 202 extending obliquely in both-side neighborhoods of the cooling-water flow path grooves 204. Thus, the anode-side separator 120 allows cooling water supplied from the cooling water supply holes 126IN to flow toward the cooling water discharge holes 126OT without being interrupted by the fuel-gas flow path grooves 202 extending along the x direction or the y direction. That is, the cooling water, as a result of merging of cooling water flowing through the cooling-water flow path grooves 204 and cooling water flowing through the fuel-gas flow path grooves 202, flows over not only the cooling-water-supply-hole vicinal region B but also the whole of turn-over regions A while the flow direction of the cooling water is changed.

The anode-side separator 120 has the fuel-gas flow path grooves 202 in which the deep groove portions 206 and the shallow groove portions 208 are juxtaposed alternately and successively along the groove paths in the turn-over regions A of FIG. 3. Meanwhile, in the linear path routes of the serpentine-shaped groove paths, i.e. in the x direction of FIG. 3, other fuel-gas flow path grooves 202 including the terminal first grooves 202t on the gas surface side as well as the cooling-water flow path grooves 204 on the cooling water side in the anode-side separator 120 are formed into simple recessed groove shapes.

As shown in FIG. 4, the anode-side separator 120 also includes guide protruded portions 127 and an inter-supply-hole protruded portion 128. Each guide protruded portion 127 is inclined relative to the separator central region 121 so as to be protruded toward the cooling surface side, having a planar shaped top surface, between the cooling water supply holes 126IN and the separator central region 121 (see FIG. 3). The inter-supply-hole protruded portion 128 is protruded in such a shape as to extend from the guide protruded portions 127 to between the supply holes, having a planar-shaped top surface. These guide protruded portions 127 and inter-supply-hole protruded portion 128 are protruded toward the cooling surface side so that their top surfaces become equal in height to the bottom walls 202s of the deep groove portions 206. Therefore, by contact of the anode-side separator 120 with the later described cathode-side separator 130, the guide protruded portions 127 and the inter-supply-hole protruded portion 128 have their top surfaces brought into close contact with the cathode-side separator 130 to form a cooling water flow region between the two separators, fulfilling a flow regulating function of, while guiding cooling water derived from the cooling water supply holes 126IN, leading the cooling water into the cooling-water flow path grooves 204 and the communicative flow path grooves 205.

Figure 5:
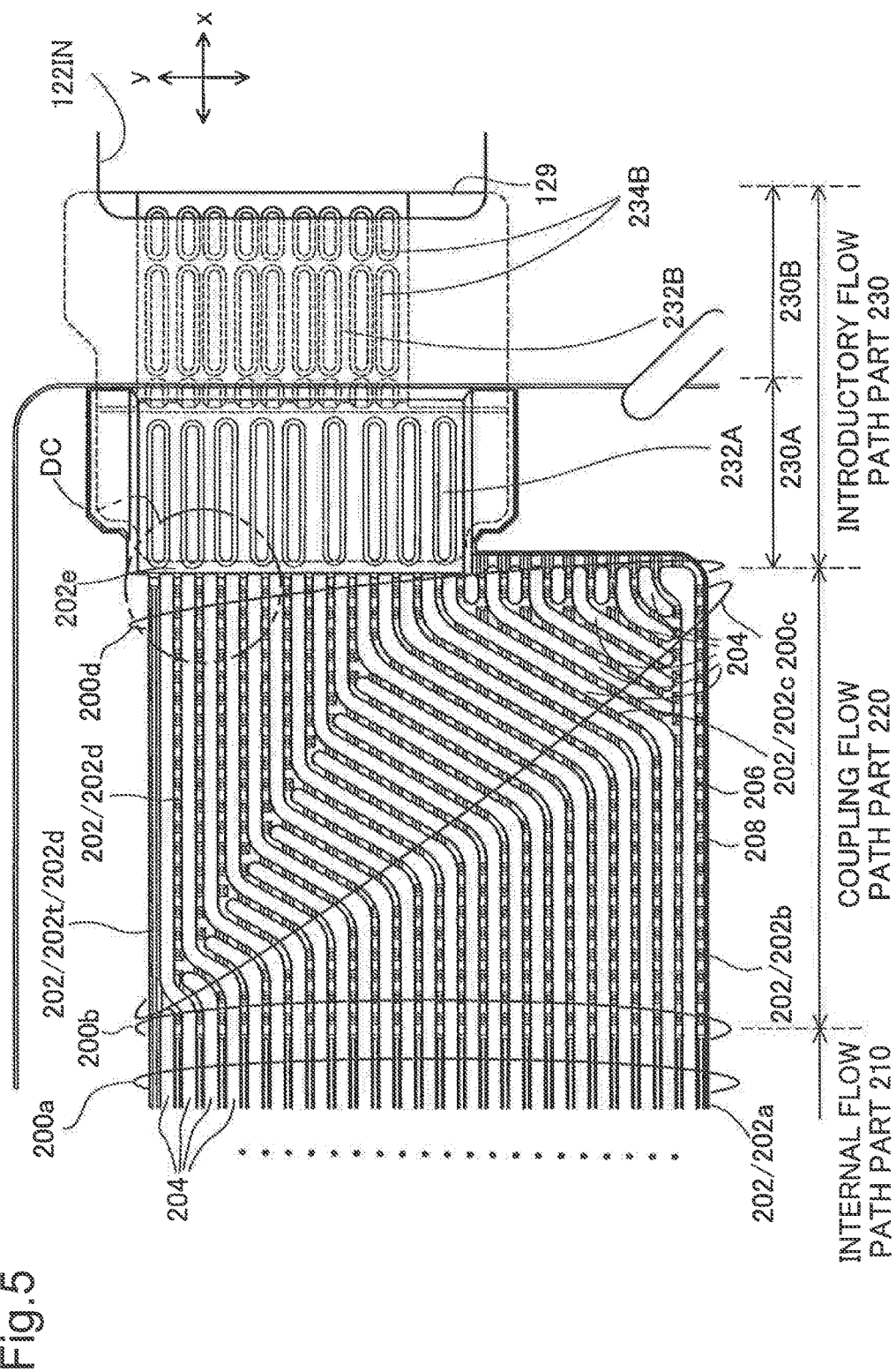
FIG. 5 is an explanatory view showing a way how flow path grooves are formed in a fuel-gas-supply-hole vicinal region D included in the turn-over region A shown in FIG. 3, as it is viewed and enlarged in a plan view from a cooling surface side.

FIG. 5 is an explanatory view showing a way how flow path grooves are formed in a fuel-gas-supply-hole vicinal region D included in the turn-over region A shown in FIG. 3, as it is viewed and enlarged in a plan view from the cooling surface side. Also in this FIG. 5, the drawing-sheet near side is the cooling surface side while the drawing-sheet far side is the gas surface side.

As shown in FIG. 5, in a fuel-gas-inlet side region connecting to the fuel gas supply hole 122IN, the fuel-gas flow path grooves 202 in the separator central region 121 (see FIG. 3) are composed of an internal flow path part 210 extending horizontally (in the x direction), a coupling flow path part 220, and an introductory flow path part 230. The introductory flow path part 230 is a flow path region connecting to the fuel gas supply hole 122IN. The coupling flow path part 220 is a flow path region for delivering fuel gas, which has flowed up from the fuel gas supply hole 122IN via the introductory flow path part 230, to the individual gas flow paths of the internal flow path part 210, the coupling flow path part 220 being a flow path region which extends in the x direction, then being inclined and again extending in the x direction as shown in the figure. That is, the coupling flow path part 220 is composed of: a first coupling flow path part 200b extending in the x direction so as to connect to a fuel-gas flow path part 200a formed of fuel-gas flow path grooves 202 belonging to the internal flow path part 210; an inclined second coupling flow path part 200c connecting to the first coupling flow path part 200b; a third coupling flow path part 200d extending in the x direction so as to connect to the second coupling flow path part 200c; and boundary flow path grooves 202e for coupling the third coupling flow path part 200d and the introductory flow path part 230 to each other.

The first coupling flow path part 200b is formed of a plurality of first coupling flow path grooves 202b that connect to a plurality of fuel-gas flow path grooves 202a of the fuel-gas flow path part 200a and extend in the x direction. The second coupling flow path part 200c is formed of a plurality of second coupling flow path grooves 202c (hereinafter, referred to also as inclined gas-flow-path groove part 202c) that extend downward along a direction inclined toward the gravitational direction from the first coupling flow path grooves 202b. These second coupling flow path grooves 202c preferably extend downward along a direction inclined relative to the gravitational direction (e.g., oblique downward direction), but may extend in the gravitational direction. The third coupling flow path part 200d is formed of a plurality of third coupling flow path grooves 202d which connect to the boundary flow path grooves 202e and the second coupling flow path grooves 202c and which extend in the x direction. The boundary flow path grooves 202e are formed of grooves which extend along the y direction at a boundary between the third coupling flow path part 200d and the introductory flow path part 230. In addition, the individual coupling flow path grooves 202b, 202c, 202d constituting the coupling flow path part 220 each include deep groove portions 206 and shallow groove portions 208 provided scatteredly and alternately along their respective groove paths, as with the fuel-gas flow path grooves shown in FIG. 4, and communicative flow path grooves equivalent to the communicative flow path grooves 205 of FIG. 4 for allowing cooling water to flow on the cooling surface side are constituted by neighboring cooling-water flow path grooves 204.

The introductory flow path part 230 is composed of a first introductory flow path part 230A connecting to the boundary flow path grooves 202e, and a second introductory flow path part 230B connecting to the first introductory flow path part 230A and the fuel gas supply hole 122IN. These introductory flow path parts 230A, 230B are formed between a sealing plate 129 placed against the gas surface of the anode-side separator 120 and the anode-side separator 120. The first introductory flow path part 230A is formed of a plurality of first introductory flow path grooves 232A connecting to the boundary flow path grooves 202e and constituting generally comb-tooth like flow paths. Also, the second introductory flow path part 230B is formed of generally comb-tooth like protruded portions 234B formed in the sealing plate 129 to constitute generally comb-tooth like flow paths.

Although depiction and description are omitted, an outlet-side region connecting to the fuel gas discharge hole 122OT out of the fuel gas flow path 200 is also constituted of an introductory flow path part connecting to the fuel gas discharge hole 122OT, and a coupling flow path part between the introductory flow path part and the internal flow path part, as in the case of the inlet-side region.

The cooling-water flow path grooves 204 are formed between the above-described fuel-gas flow path parts 200a to 202d, and seemingly closed cooling-water flow path grooves 204 are formed along the groove-path direction in the region for formation of the second coupling flow path grooves 202c. However, since numerous communicative flow path grooves 205 that permit the passage of cooling water are formed of deep groove portions 206 and shallow groove portions 208 in the respective fuel-gas flow path grooves 202 in neighboring cooling-water flow path grooves 204 as described in FIG. 4, cooling water flows and enters the cooling-water flow path grooves 204 closed in the groove-path direction by passage between neighboring cooling-water flow path grooves 204, thus flowing along the cooling water flow path grooves.

Figure 6:
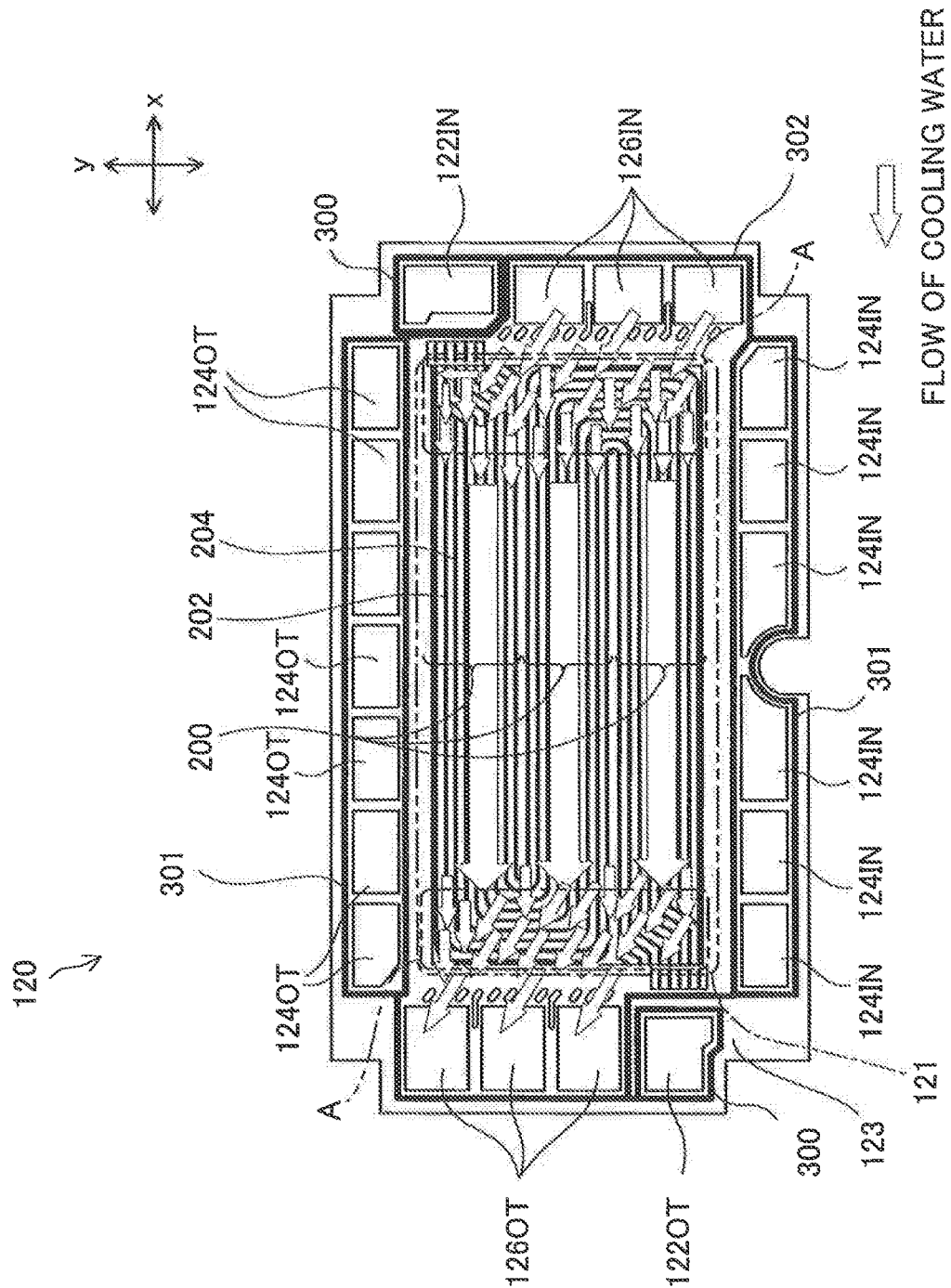
FIG. 6 is an explanatory view schematically showing an aspect of flow of the cooling water on the cooling surface side in the anode-side separator 120.

Since the anode-side separator 120 of this embodiment has the groove structure described with reference to FIGS. 4 and 5 in the left/right both-terminal turn-over regions A of the separator central region 121 shown in FIG. 3, cooling water is passed as follows over the range from the cooling water supply holes 126IN to the cooling water discharge holes 126OT. FIG. 6 is an explanatory view schematically showing an aspect of flow of the cooling water on the cooling surface side in the anode-side separator 120. As shown in the figure, cooling water supplied from the individual supply holes of the cooling water supply holes 126IN, passing via the communicative flow path grooves 205, enters the cooling-water flow path grooves 204 of the supply-hole side turn-over region A. The flow of the cooling water in this case is subjected to flow regulation at the guide protruded portions 127 and the inter-supply-hole protruded portion 128 (see FIG. 4) so as to form a flow directed generally obliquely upward from the cooling water supply holes 126IN positioned on the right-lower end side of the anode-side separator 120 as viewed in the figure.

Since the communicative flow path grooves 205 for permitting cooling water to pass through between neighboring cooling-water flow path grooves 204 have been formed in the turn-over regions A (see FIG. 4), the flow of the cooling water as a whole turns into the horizontal direction directed toward the cooling water discharge holes 126OT in the turn-over region A. That is, the anode-side separator 120 gives rise to the above-described flow of cooling water due to the communicative flow path grooves 205 as a result of scattered disposition of the deep groove portions 206 and the shallow groove portions 208. Moreover, for introduction of cooling water from the cooling water supply holes 126IN into the individual cooling-water flow path grooves 204 extending horizontally over an up-and-down range of the separator central region 121 (see FIG. 3), the anode-side separator 120, in the turn-over region A on the fuel gas supply hole 122IN side, diffuses and leads cooling water supplied from the cooling water supply holes 126IN of the outer edge portion 123 into the individual grooves of the cooling-water flow path grooves 204, while the cooling water is changed in its flow direction, by the guide protruded portions 127 and the inter-supply-hole protruded portion 128, the deep groove portions 206 and the shallow groove portions 208 disposed scatteredly in the fuel-gas flow path grooves 202. In this case, there occur flows of cooling water directed toward the upper end of the separator central region 121 in vicinities of the corner portion of the separator central region 121 on the fuel gas supply hole 122IN side, i.e. the corner portion of the separator central region on the upper end side of the separator central region 121 and moreover on the cooling water supply holes 126IN side.

In the fuel gas flow path 200 following the turn-over region A on the cooling water supply holes 126IN side, the individual fuel-gas flow path grooves 202 constituting the flow path extend along the horizontal direction (x direction) as in the figure. Accordingly, cooling water that has turned into the horizontal direction at the turn-over region A flows horizontally along the fuel-gas flow path grooves 202. Then, in the turn-over region A on the cooling water discharge holes 126OT side, the flow direction of the cooling water as a whole is turned from the horizontal direction into directions toward the individual cooling water discharge holes 126OT by the already-described communicative flow path grooves 205. The anode-side separator 120, while subjecting the cooling water to regulation by the guide protruded portions 127 and the inter-supply-hole protruded portion 128 (see FIG. 4), leads the cooling water from within the grooves of the cooling-water flow path grooves 204 to the fuel gas discharge hole 122OT.

Figure 7:
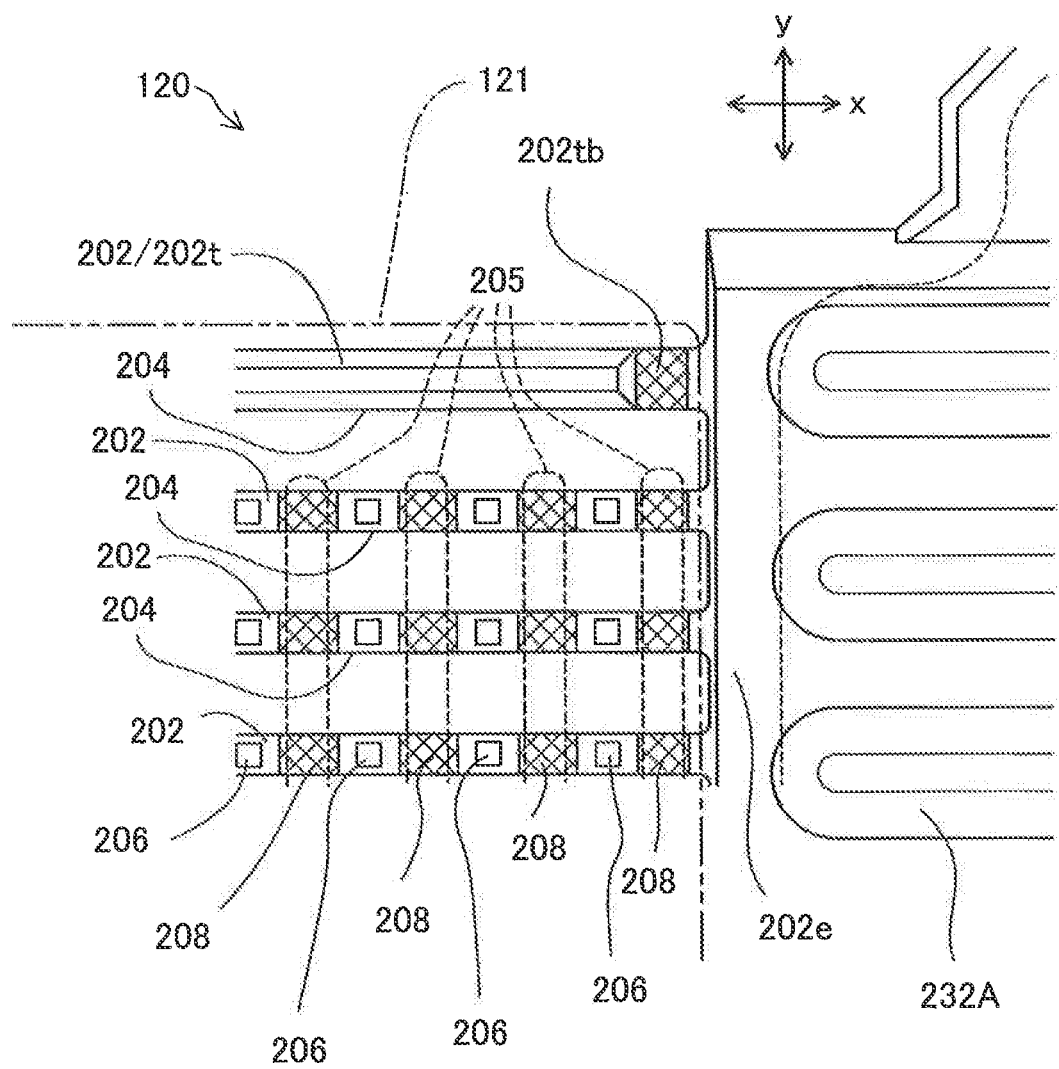
FIG. 7 is an explanatory view showing a way how flow path grooves are formed in a corner portion DC of a separator central region 121 on a fuel gas supply hole 122IN side shown in FIG. 5, as it is viewed and further enlarged in a plan view from the cooling surface side.
Figure 8:
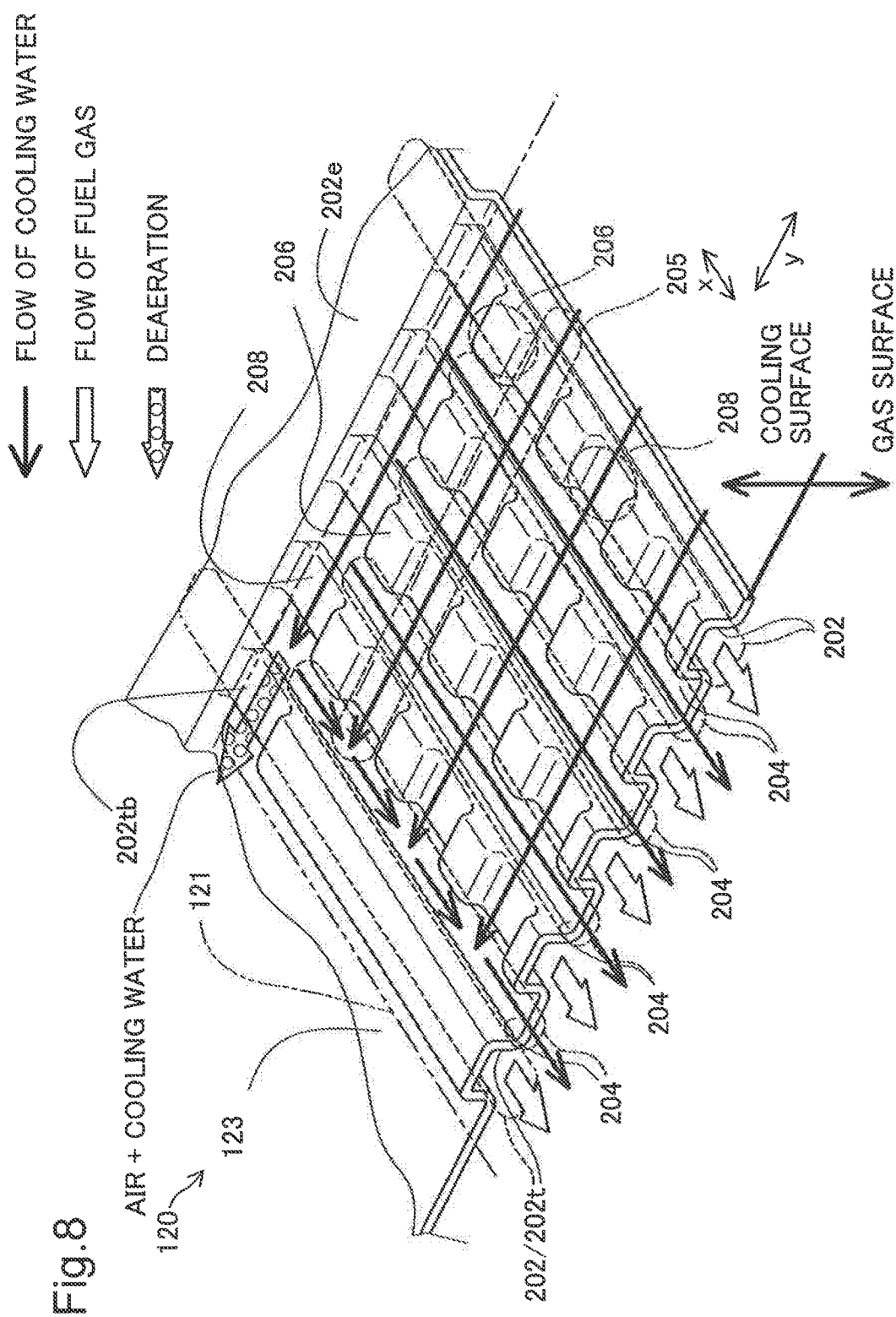
FIG. 8 is an outlined perspective view showing a way how flow path grooves are formed in the corner portion DC of the separator central region 121, as it is viewed from the cooling surface side and enlarged.

Next, a flow path structure in the corner portion of the separator central region 121 on the fuel gas supply hole 122IN side will be described in detail. FIG. 7 is an explanatory view showing a way how flow path grooves are formed in the corner portion DC of the separator central region 121 on the fuel gas supply hole 122IN side shown in FIG. 5, as it is viewed and further enlarged in a plan view from the cooling surface side. FIG. 8 is an outlined perspective view showing a way how flow path grooves are formed in the corner portion DC of the separator central region 121, as it is viewed from the cooling surface side and enlarged.

As shown in the figures, the anode-side separator 120 has a depressed corner recess 202tb in the terminal first grooves 202t extending in the horizontal direction (x direction) at the upper end of the separator central region 121. This depressed corner recess 202tb is set shallower in depth than other portions of the terminal first grooves 202t, as in the shallow groove portions 208 provided in the fuel-gas flow path grooves 202. In FIG. 7, the shallower-in-depth shallow groove portions 208 and the depressed corner recess 202tb are depicted with their positions hatched. Then, since the depressed corner recess 202tb is kept from contact with the MEGA 110 as in the shallow groove portions 208, the gas surface-side terminal first grooves 202t allow the fuel gas to pass therethrough in the x direction along the flow-path-groove routes. Also, the anode-side separator 120 keeps the outer peripheral surface, i.e. ceiling surface in the case of FIG. 8, of the depressed corner recess 202tb out of contact with the cathode-side separator 130, as in the shallow groove portions 208. Accordingly, the depressed corner recess 202tb makes communications enabled between the cooling-water flow path grooves 204, which extend in the x direction under the terminal first grooves 202t in FIG. 7, and the outer edge portion 123 located upward of the terminal first grooves 202t. As a result of this, the cooling water that has flowed into the cooling-water flow path grooves 204 located downward of the terminal first grooves 202t, after passing through the depressed corner recess 202tb, is permitted to pass to the outer edge portion 123 side of the outer edge of the separator central region 121.

Figure 9:
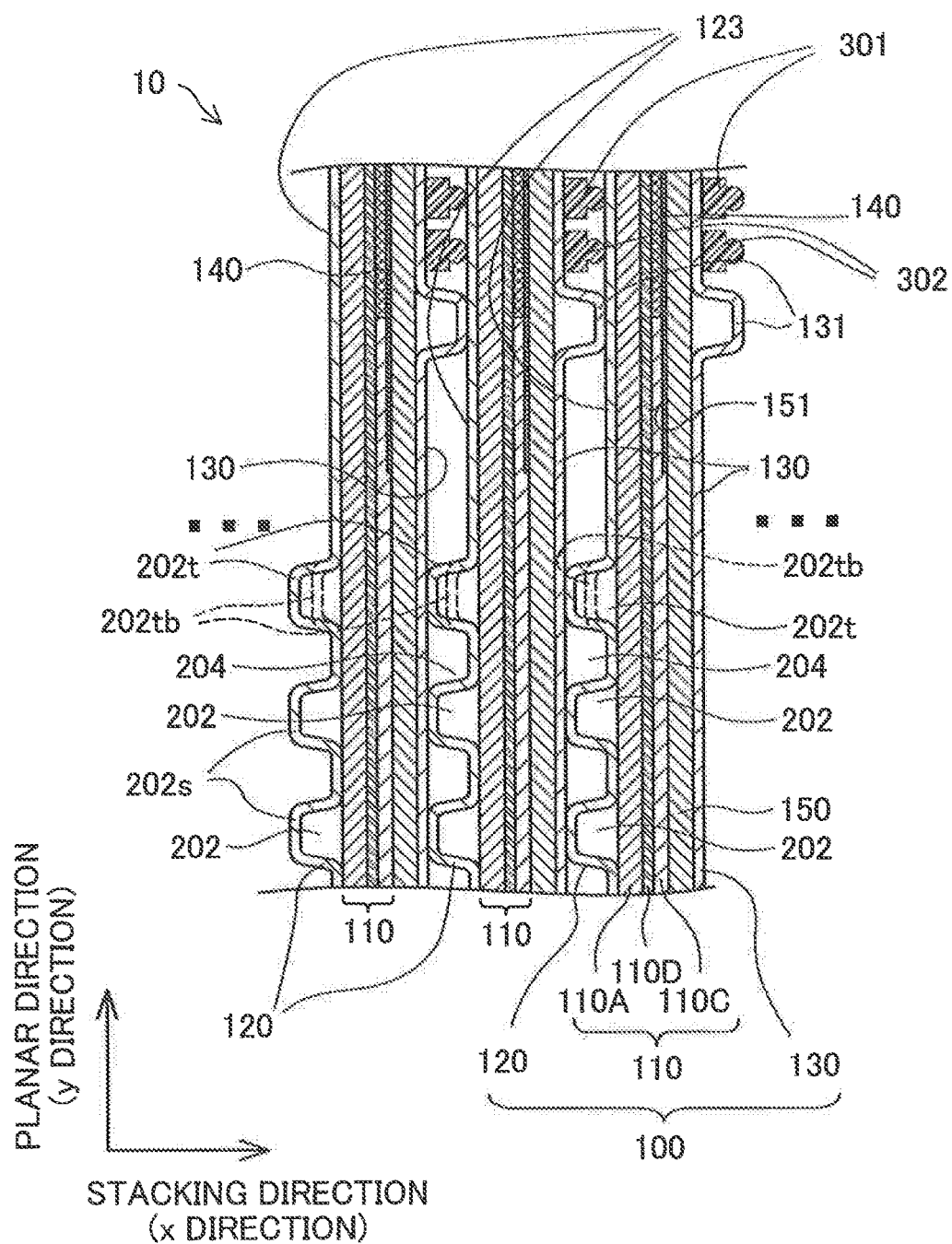
FIG. 9 is an outlined sectional view of the fuel cell 10 taken along a line 9-9 in the C-part enlargement in FIG. 3.

Next, the way how the unit cells 100 are stacked in the fuel cell 10 will be described. FIG. 9 is an outlined sectional view of the fuel cell 10 taken along a line 9-9 in the C-part enlargement in FIG. 3. As shown in the figure, the fuel cell 10 is made up by stacking a plurality of unit cells 100, where each unit cell 100 has the MEGA 110 sandwiched by the anode-side separator 120 and the cathode-side separator 130. In this FIG. 9, the MEGA 110 is depicted in an aspect that an MEA 110D having catalytic electrode layers joined on both membrane surfaces of an electrolyte membrane is sandwiched by an anode-side gas diffusion layer 110A and a cathode-side gas diffusion layer 110C. Then, for each unit cell 100, the outer edge portion 123 (see FIGS. 2 and 3) which is included in the anode-side separator 120 so as to extend outward of the separator central region 121 is joined to the MEGA 110 at peripheral edges of the power generation region 112 (see FIGS. 2 and 3) of the MEGA 110. Also in each unit cell 100, the separator central region 121 with the first grooves 202 and the second grooves 204 already formed therein is opposed and joined to the power generation region 112 of the MEGA 110. As a result of this, the terminal first grooves 202t and the first grooves 202 of other sites are closed at their recessed-groove opening ends by the MEGA 110, thus functioning as the fuel-gas flow path grooves 202 extending as already described.

With regard to unit cells 100 stacked so as to neighbor each other, bottom walls 202s of first grooves 202 of the anode-side separator 120 in one unit cell 100 are brought into contact with the cathode-side separator 130 in the other unit cell 100. As a result of this, the second grooves 204 are closed at their recessed-groove opening ends, functioning as the cooling-water flow path grooves 204 extending as already described. Also with regard to unit cells 100 stacked so as to neighbor each other, limbs 131 of the cathode-side separator 130 in one unit cell 100 are brought into contact with the outer edge portion 123 of the anode-side separator 120 in the other unit cell 100. As a result of this, the limbs 131 function as support of the individual unit cells 100 at the outer edge portion 123 of the anode-side separator 120. Moreover, with regard to unit cells 100 stacked so as to neighbor each other, the cooling water sealing material 302 (see FIG. 3) surrounding the cooling water flow region including the separator central region 121 and the fuel gas discharge hole 122OT on the cooling surface side, i.e. on the side in which the fuel gas supply hole 122IN and the cooling-water flow path grooves 204 are opened, as well as the oxidizing sealing materials 301 surrounding the oxidizing gas discharge holes 124OT, are sandwiched between the anode-side separator 120 of one unit cell 100 and the cathode-side separator 130 of the other unit cell 100 on the upper end side of the separator. In addition, the cooling water sealing material 302 and the oxidizing sealing materials 301 surrounding the oxidizing gas supply holes 124IN on the lower end side of the separator, as well as the cooling water sealing material 302, the fuel gas sealing materials 300 surrounding the fuel gas supply hole 122IN, and the fuel gas sealing materials 300 surrounding the fuel gas discharge hole 122OT on the left/right both ends of the separator, are sandwiched between the anode-side separator 120 of one unit cell 100 and the cathode-side separator 130 of the other unit cell 100. The fuel cell 10 in which the unit cells 100 are stacked as described above is tightened in the cell-stacking direction with an unshown tightening shaft or the like.

The fuel cell 10 in this embodiment is subjected to air discharge process from the cooling-water flow path grooves 204 of the anode-side separator 120 in individual unit cells 100 at a time point when the multilayering and stacking shown in FIG. 9 as well as the tightening are completed. That is, for the anode-side separator 120, cooling water is supplied from the cooling water supply holes 126IN. The cooling water supplied in this way, after reaching the turn-over region A located on the cooling water supply holes 126IN side in the separator central region 121, is passed through between neighboring cooling-water flow path grooves 204 by the communicative flow path grooves 205 in the region, thus diffusively entering the respective cooling-water flow path grooves 204 through the cooling water supply holes 126IN. As a result, the cooling water spreads to the entire turn-over region A on the fuel gas supply hole 122IN side. According to the fuel cell 10 of this embodiment, a vicinal region of the fuel gas supply hole 122IN to which fuel gas supplied upon power generation operation first reaches, as it is, unconsumed, making the vicinal region more active in power generation reaction, and can be cooled with high efficiency.

Figure 10:
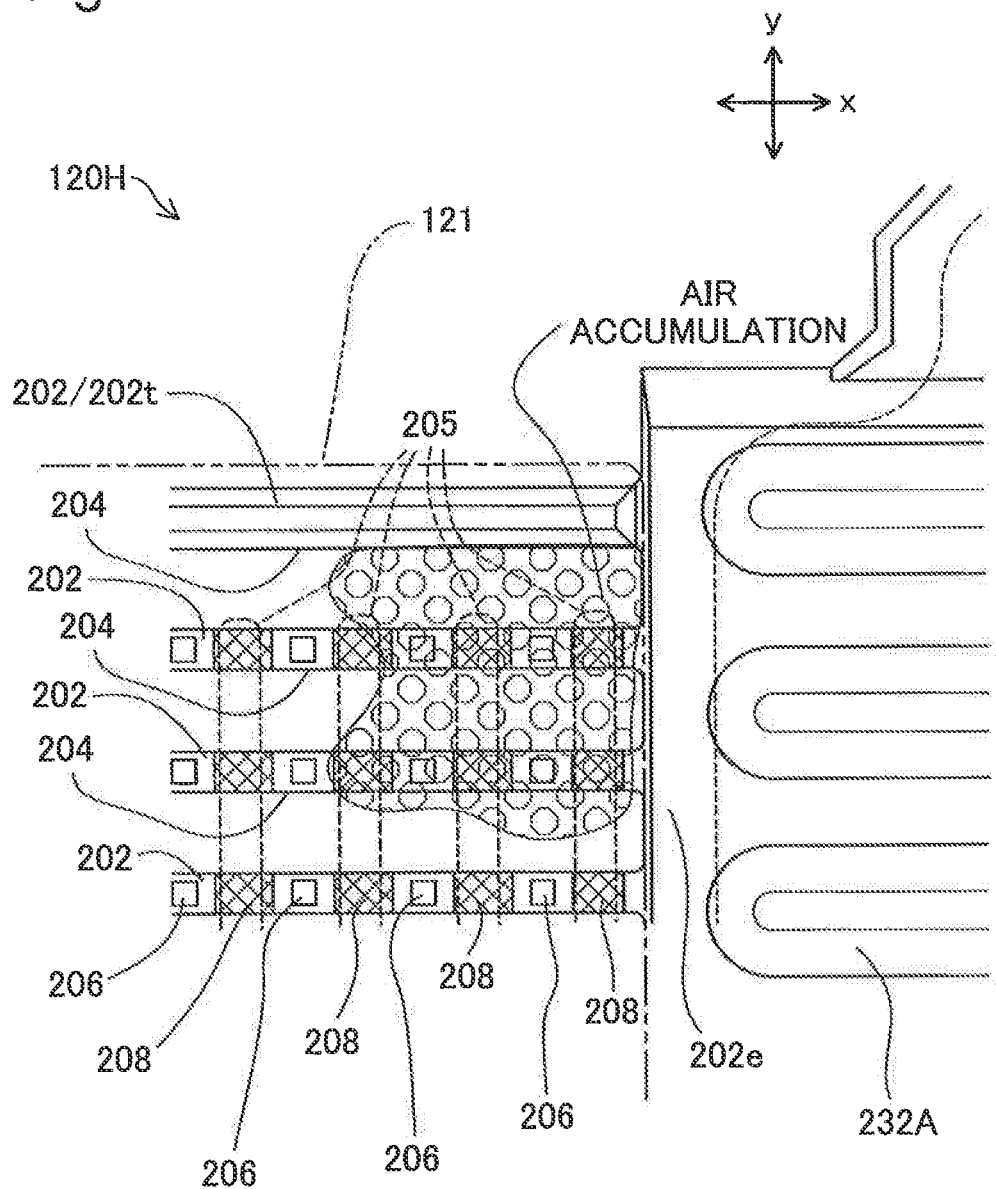
FIG. 10 is an explanatory view showing a way how flow path grooves are formed in the corner portion DC of the separator central region 121 in a comparative-example anode-side separator 120H, as it is viewed and further enlarged in a plan view from the cooling surface side.

The cooling water that has entered the cooling-water flow path grooves 204 in this way pushes air away, if the air remains left in the grooves, when flowing through the cooling-water flow path grooves 204 along the groove paths. Then, the flow of the cooling water in the turn-over region A, as described with FIG. 6, is turned over from an oblique upward flow direction, which is a flow direction from the cooling water supply holes 126IN, to a horizontal direction directed toward the cooling water discharge holes 126OT. While the cooling water flows through the cooling-water flow path grooves 204 and the communicative flow path grooves 205 in the turn-over region A, even air in these grooves is pushed away by the flow of the cooling water, whereas the cooling water passes therethrough with its flow direction changed as already described, posing a possibility that the flow of the cooling water can be stagnated. Accordingly, if air remains left in the cooling-water flow path grooves 204, the air may remain in the cooling-water flow path grooves 204 without being pushed away depending on the state how the flow of the cooling water is stagnated. Then, in the turn-over region A on the fuel gas supply hole 122IN side, as shown in FIGS. 4 and 8, where the cooling-water flow path grooves 204 extending in the up/down direction (y direction) and the communicative flow path grooves 205 connecting thereto are provided, the air in the grooves can rise toward the terminal first grooves 202t. FIG. 10 is an explanatory view showing a way how flow path grooves are formed in the corner portion DC of the separator central region 121 in a comparative-example anode-side separator 120H, as it is viewed and further enlarged in a plan view from the cooling surface side.

In the comparative-example anode-side separator 120H shown in the figure, the terminal first grooves 202t at the upper end of the separator central region 121 are formed into a simple recessed groove shape having no depressed corner recess 202tb. Then, the cooling-water flow path grooves 204 extending below the terminal first grooves 202t are put into a closed state by contact with the cathode-side separator 130, so that the air in the grooves that has risen toward the terminal first grooves 202t is blocked by the terminal first grooves 202t from rising any more, making it assumable that the air forms an air accumulation on the terminal end side of the terminal first grooves 202t. Then, the resulting air accumulation covers the vicinal region of the fuel gas supply hole 122IN to which the fuel gas first reaches, as it is, unconsumed so as to make the vicinal region more active in power generation reaction.

In contrast to this, the anode-side separator 120 of this embodiment has the depressed corner recess 202tb in the terminal first grooves 202t as shown in FIGS. 7 and 8. This depressed corner recess 202tb allows communications between the cooling-water flow path grooves 204 extending in the x direction below the terminal first grooves 202t and the outer edge portion 123 located upward of the terminal first grooves 202t, so that the air in the grooves that has risen toward the terminal first grooves 202t passes through the depressed corner recess 202tb along with the cooling water that has risen toward the terminal first grooves 202t, thus the air being discharged from the separator central region 121 to the outer edge portion 123 of its outer edge. Therefore, according to the fuel cell 10 of this embodiment, there can be obtained a state that no air remains left over the entire separator central region 121 including vicinities of the fuel gas supply hole 122IN, so that the individual unit cells 100 can be cooled with high cooling efficiency. In addition, the air discharged to the outer edge portion 123 as shown above, passing through between the outer edge portion 123 and the cathode-side separator 130 (see FIG. 9), is discharged from the cooling water discharge holes 126OT out of the unit cell.

The fuel cell 10 of this embodiment is prevented from air accumulation in the cooling-water flow path grooves 204 in vicinal regions of the fuel gas supply hole 122IN to which the fuel gas first reaches, as it is, unconsumed, making the vicinal regions more active in power generation reaction, so that the cooling effect can be maintained or improved.

According to the anode-side separator 120 of this embodiment, the depressed corner recess 202tb where the bottom wall is depressed may be formed at a portion closer to the terminal end than the fuel gas supply hole 122IN side of the terminal first grooves 202t, so that the structure for preventing the air accumulation can be simplified and moreover the air accumulation can be prevented conveniently. Still, since the formation of the depressed corner recess 202tb in the terminal first grooves 202t is fulfilled by press molding of other second grooves 204 including the terminal first grooves 202t and the fuel-gas flow path grooves 202, the manufacturing cost for the separator can be reduced. Since the depressed corner recess 202tb is shallower in groove depth than other groove-path sites of the terminal first grooves 202t, it is enough to only grind, with use of precision grindstone equipment, the protrusive-stripe vertex of a press male mold used for the molding of the terminal first grooves 202t having a uniform groove shape. From this point of view, according to the anode-side separator 120 of this embodiment, the separator manufacturing cost can be reduced and moreover the problem of air accumulation prevention can be solved or suppressed with a simple technique of grinding of the protrusive-stripe vertex of the press male mold. Further, since the grinding of the protrusive-stripe vertex of the existing press male mold will do enough, effective use of existing equipment is allowed and moreover the separator manufacturing cost can be further reduced by the reduction of the mold cost.

In the anode-side separator 120 of this embodiment, for diffusive introduction of cooling water to the cooling-water flow path grooves 204 while the flow direction of the cooling water is changed in the turn-over regions A, the deep groove portions 206 and the shallow groove portions 208 are formed scatteredly in the groove-path routes of the fuel-gas flow path grooves 202. The shallow groove portions 208 only need to be made shallower than the deep groove portions 206 and may be formed by press molding as in the already-described depressed corner recess 202tb. Therefore, also in this regard, according to the anode-side separator 120 of this embodiment, the separator manufacturing cost can be reduced.

The fuel cell 10 of this embodiment uses the anode-side separator 120 that realizes the prevention of an air accumulation at the depressed corner recess 202tb of the corner portion DC (see FIG. 5) of the separator central region 121. Therefore, according to the fuel cell 10 of this embodiment, since no cooling inefficiency is incurred during its power generation operation, the cell performance can be maintained or improved.

For the fuel cell 10 of this embodiment, the anode-side separator 120 having the depressed corner recess 202tb in the terminal first grooves 202t extending at the upper end of the separator central region 121 may be replaced with another one in the existing unit cell 100. Therefore, according to the fuel cell 10 of this embodiment, a reduction of the cell manufacturing cost can be achieved and moreover such failures as cooling insufficiency or the like that can occur due to an air accumulation can be solved or suppressed with simplicity.

In the fuel cell 10 of this embodiment, each unit cell 100 has only one depressed corner recess 202tb in the corner portion DC on the fuel gas supply hole 122IN side of the separator central region 121. Therefore, since cooling water is prevented from unexpectedly flowing out from the separator central region 121 to its outer edge portion 123 via the depressed corner recess 202tb, there is never incurred cooling insufficiency in the separator central region 121.

The present invention is not limited to the above-described embodiment and may be implemented in various configurations unless those configurations depart from the gist of the invention. For example, technical features in the embodiment corresponding to technical features in the individual aspects described in the section of Summary may be replaced or combined with one another, as required, in order to solve part or entirety of the above-described problems or to achieve part or entirety of the above-described advantageous effects. Moreover, those technical features may be deleted, as required, unless herein otherwise described as indispensable.

In the anode-side separator 120 of the above-described embodiment, the depressed corner recess 202tb is provided in the terminal first grooves 202t at the corner portion DC (see FIG. 5) of the separator central region 121. However, in cases where an air accumulation can occur at other sites depending on the groove-path routes of the fuel-gas flow path grooves 202 or the cooling-water flow path grooves 204, the depressed corner recess 202tb may be provided at such sites. Places where the air accumulation can occur may be specifically determined by empirical techniques using the unit cell 100 itself as well as simulations using computers. Otherwise, a depressed corner recess 202tb similar to that on the fuel gas supply hole 122IN side may be provided at a corner portion of the separator central region 121 on the cooling water discharge holes 126OT side. Depressed corner recesses 202tb may be provided at plural places of the terminal first grooves 202t extending at the upper end of the separator central region 121.

In this embodiment, as shown in FIG. 6, a flow of cooling water is directed from the cooling water supply holes 126IN on the right side in the figure of the anode-side separator 120 toward the opposite cooling water discharge holes 126OT with the separator central region 121 interposed therebetween. However, conversely, the cooling water discharge holes 126OT of FIG. 6 may be replaced with the cooling water supply holes 126IN, and the cooling water supply holes 126IN of FIG. 6 may be replaced with the cooling water discharge holes 126OT. Even in such a case, the depressed corner recess 202tb may be provided in the terminal first grooves 202t at a corner portion of the separator central region 121 on the left end side of FIG. 6, and the depressed corner recess 202tb may be provided also at the right-side corner portion.

In this embodiment, the fuel-gas flow path grooves 202 and the cooling-water flow path grooves 204 are formed by press molding. However, the fuel-gas flow path grooves 202 and the cooling-water flow path grooves 204 may be provided on the front and back surfaces of the separator by cutting process or the like.

The invention claimed is:

1. A fuel cell separator being assembled to a membrane electrode assembly, the fuel cell separator being rectangular in shape and having longitudinal ends and long ends; the fuel cell separator having a first surface and a second surface as a back surface of the first surface, the fuel cell separator comprising:
- a central region opposed to a power generation-enabled region of the membrane electrode assembly;
- an outer edge portion extending from the central region to surrounding edge portion of the central region and having a cooling water supply hole and a cooling water discharge hole arranged along respective longitudinal ends of the separator;
- a first surface-side recessed groove part including a plurality of grooves formed in the central region on the first surface;
- a second surface-side recessed groove part including a plurality of grooves formed in the central region in the second surface; and
- an air discharge part formed on an upper end side of the central region in the first surface-side recessed groove part, the air discharge part connecting between the central region and the outer edge portion, and discharging air within the plurality of grooves of the second surface-side recessed groove part from the central region to the outer edge portion along with the cooling water,
- wherein the air discharge part is formed at a place where air within the plurality of grooves of the second surface-side recessed groove part is accumulable on the upper end side of the central region because of changing flow direction of the cooling water passing through the second surface-side recessed groove part: the fuel cell separator further comprising:
- a cooling water supply-side manifold disposed at the outer edge portion on one side of the central region in horizontal direction; and
- a cooling water introducing part configured to diffuse and introduce cooling water supplied from the cooling water supply-side manifold into individual grooves of the second surface-side recessed groove part with changing flow direction of the cooling water, wherein the air discharge part is formed at a central-region corner portion positioned on the upper end side of the central region and on the side of the cooling water introducing part.

2. The fuel cell separator in accordance with claim 1, further comprising
- a fuel gas supply-side manifold configured to supply fuel gas into the plurality of grooves of the first surface-side recessed groove part, the fuel gas supply-side manifold disposed at the upper side of the cooling water supply-side manifold in the outer edge portion.

3. The fuel cell separator in accordance with claim 2, wherein
the plurality of grooves of the first surface-side recessed groove part and the plurality of grooves of the second surface-side recessed groove part are formed alternately on the first surface and the second surface in the central region by formation of a plurality of pit-and-bump stripes provided by press molding of the central region, and
the air discharge part is a bottom-wall recessed part where a bottom wall of the first surface-side recessed groove part positioned at the upper end of the central region is recessed.

4. The fuel cell separator in accordance with claim 3, wherein the cooling water introducing part includes shallow groove portions being scatteredly along path of the first surface-side recessed groove part, wherein the shallow groove portions are partly shallower in depth in the first surface-side recessed groove part and are formed alternately on the first surface and the second surface against the second surface-side recessed groove part.

5. The fuel cell separator in accordance with claim 1, wherein
the plurality of grooves of the first surface-side recessed groove part and the plurality of grooves of the second surface-side recessed groove part are formed alternately on the first surface and the second surface in the central region by formation of a plurality of pit-and-bump stripes provided by press molding of the central region, and
the air discharge part is a bottom-wall recessed part where a bottom wall of the first surface-side recessed groove part positioned at the upper end of the central region is recessed.

6. The fuel cell separator in accordance with claim 5, wherein the cooling water introducing part includes shallow groove portions being scatteredly along path of the first surface-side recessed groove part, wherein the shallow groove portions are partly shallower in depth in the first surface-side recessed groove part and are formed alternately on the first surface and the second surface against the second surface-side recessed groove part.

7. A fuel cell comprising stacked plurality of unit cells, each of the unit cells having a membrane electrode assembly sandwiched between a first separator and a second separator, each of the unit cells including:
the fuel cell separator of claim 1 as the first separator, wherein in the unit cells are adjoiningly stacked,
a bottom wall of the first surface-side recessed groove part included in the first separator of one of the unit cells is in contact with the second separator of another unit cell.

* * * * *